United States Patent [19]

Berejka et al.

[11] 4,300,988

[45] Nov. 17, 1981

[54] POLYBUTYLENE AND CONJUGATED DIENE BUTYL POLYMER BLENDS

[75] Inventors: Anthony J. Berejka, Huntington; Richard Bradley, Medford, both of N.Y.

[73] Assignee: Radiation Dynamics, Inc., Melville, N.Y.

[21] Appl. No.: 172,308

[22] Filed: Jul. 25, 1980

[51] Int. Cl.³ .......................... C08F 2/46; C08L 9/00
[52] U.S. Cl. ..................... 204/159.2; 260/45.85 B; 525/232
[58] Field of Search .................. 204/159.2; 525/213, 525/232

[56] References Cited

U.S. PATENT DOCUMENTS

| | | | |
|---|---|---|---|
| 3,037,954 | 6/1962 | Gessler et al. | 260/29.8 |
| 3,262,997 | 7/1966 | Edwards et al. | 525/232 |
| 3,320,330 | 5/1967 | Battline | 204/159.2 |
| 3,775,387 | 11/1973 | Baldwin | 525/361 |
| 3,816,371 | 6/1974 | Baldwin | 525/237 |
| 4,104,210 | 8/1978 | Coran et al. | 260/4 R |
| 4,116,914 | 9/1978 | Coran et al. | 260/30.6 R |
| 4,130,534 | 12/1978 | Coran et al. | 260/33.6 AQ |
| 4,264,490 | 4/1981 | Berejka | 525/232 |

Primary Examiner—J. Ziegler
Attorney, Agent, or Firm—Howard L. Rose; Geoffrey R. Myers

[57] ABSTRACT

Blends of polybutylene and a conjugated diene butyl rubber can be cured by ionizing radiation to form products with excellent resistance to set, sufficient melt flow properties to be re-workable as a plastic after curing and which exhibit significant strength characteristics.

26 Claims, No Drawings

POLYBUTYLENE AND CONJUGATED DIENE BUTYL POLYMER BLENDS

This invention relates to blends of polybutylene and a conjugated diene butyl polymer. More particularly, this invention relates to blends and cured products thereof formed from an admixture of polyethylene and a conjugated diene butyl rubber.

Products have long been sought which have resistance to set, i.e. are resilient and rebound promptly when compressed or stretched. At the same time these products must also usually exhibit good strength characteristics. It is also desirable that they be re-workable as a plastic, even after curing, so as to be remoldable or reshapable upon heating without destroying the properties of resistance to set and good strength. In short, the desired product would have, in addition to good strength, the resistance to set of a cured rubber and the reworkability of a thermoplastic polymer. Exemplary uses for such products include flexible automotive body and interior components, shoe soles and heels, molded electrical connectors, adhesives, sealants, wire and cable insulation, sporting goods equipment, tubing, hose, and flexible films and sheets.

Unfortunately, cured rubber is not truly a "re-workable thermoplastic" within the accepted meaning of this term since its melt index, to the extent that it exists, is too low to allow any significant reshaping of the product once cured (i.e. having a melt index significantly below about 0.01 gm/10 min.). Likewise, the commonly known olefinic thermoplastics are very low in resistance to set (i.e. exhibit sets of significantly greater than about 80%). Thus, neither, alone, satisfy the need in the art.

Attempts to blend the two types of materials in order to obtain a compromise combination of the desired properties; thus resulting in a product of some limited use, have been less than fully successful. For example, attempts at producing blends of butyl rubber and polypropylene or polybutylene were unsuccessful chemically, although a special process for dynamically forming and curing blends of such a nature is taught by U.S. Pat. No. 3,037,954. Cross-linking (curing) by irradiation was also unsuccessful in that polypropylene, polybutylene and butyl rubber undergo severe chain scissioning when subjected to ionizing radiation. It was known that polybutylene and polypropylene could be cured with various chemical curing agents. It was also known that blends of polyethylene and butyl rubber could be cured with a combination of a bi-functional aromatic compound having two nitrogen containing groups and a free radical catalyst such as a peroxide catalyst. The addition of these curing agents, however, are often less than desirable.

Butyl rubber, as referred to above, is a copolymer of the monomers isoprene and isobutylene and isomers thereof. Such a polymer is usually represented by the repetitive structure:

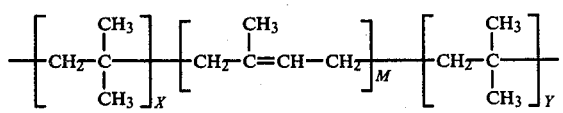

In U.S. Application Ser. No. 137,079 filed Apr. 3, 1980 (Division of Ser. No. 038,062 filed May 11, 1979), U.S. Pat. No. 4,264,490, entitled "Composition of a Polyethylene and Isobutylene Copolymer" and bearing an overlapping inventive entity herewith, there is disclosed a highly advantageous blend of polyethylene and a conjugated diene butyl polymer. The blend is cross-linkable by low dosage ionizing irradiation, bondable, and is heat recoverable without any significant loss of strength characteristics or seal. As such, it fulfills a very important need in the art. Unfortunately, this unique and otherwise advantageous blend is not re-workable as a thermoplastic once cured. Thus, a void is created in the art for a blend which has good resistance to set, good strength characteristics, and yet is also re-workable after curing.

This invention fills the above-described void or need in the art, as well as other needs apparent to the skilled artisan, once given this disclosure, by providing a composition comprising polybutylene and a conjugated diene butyl polymer. It has been found, quite surprisingly, that the admixing of these two materials act in such a way so as to provide a blend which is curable usually by ionizing radiation, and which when so cured, acts like a cured rubber to resist set, yet can be reworked as a thermoplastic upon heating without significant degradation of properties.

The blends of this invention exhibit good strength characteristics and, in certain preferred embodiments, after curing by irradiation, have modulus strength ($T_{100}$) properties superior to each of the individual components in the blend when measured alone. These blends need not be recured by either ionizing radiation or chemical means after reworking to maintain desirable properties. However, an additional post cure to obtain added strength or other desirable properties by either chemical means or ionizing radiation can be done using methods known in the art. In addition, the blends can be cured by ionizing radiation, usually at relatively low dosage levels (e.g. about 1–20 Mrads, and preferably about 2–4 Mrads), using well known radiation equipment without the use of any additive to enhance radiation response.

Generally speaking, articles formed from the aforesaid blends exhibit to a significant degree, when cured, those desired qualities measured by modulus strength ($T_{100}$), tensile strength (U.T.S.), elongation (U.E.), melt index, and set. In the preferred embodiments of this invention these desired qualities fall within the following ranges:

(A) modulus of elongation (100%, $T_{100}$, psi) at 72° F. of about 150–1100 (or more);

(B) ultimate tensile strength (U.T.S. psi) at 72° F. of about 450–3000 (or more);

(C) elongation (UE%) at 72° F. of at least about 560;

(D) a melt index (gm/10 min. at 230° C., 5 Kg) of about $1 \times 10^{-2} - 13$ (or more); and/or (E) a percent set of less than about 80% and usually about 25–75% (or less).

Generally speaking, any conventionally available polybutylene polymer may be employed in the practice of this invention. Preferably, the polybutylene is one of a relatively high molecular weight (e.g. about $3 \times 10^3$ to $1 \times 10^7$). Such preferred polybutylenes are generally synthesized primarily from butene-1 monomer and are flexible, crystalline isotactic polyolefins having a density of about 0.91 or more. The melt index of various commercially available grades of this polymer, acceptable for use in this invention range from about 0.4–20.0 (ASTM D-1238). The term "polybutylene polymer"

includes copolymers of a butene monomer and one or more other monomers. However, the amount of such other monomer(s) should not be so large as to destroy the fundamental purpose of this invention (e.g. the basic, desired characteristics of the blend) as described above. The particular choice of a specific polybutylene will depend upon the intended end use of the blend and the characteristics desired thereof, or if overriding, the production or molding parameters of either the blend, the article, or the re-working process.

The radiation curable butyl polymer useful in the practice of this invention is commonly known as a conjugated diene butyl rubber (or polymer). A single conjugated diene butyl polymer or a mixture of two or more such polymers may be used in forming the blend. Of particular use in the practice of this invention are those conjugated diene butyl polymers which comprise a copolymer of isobutylene and a conjugated $C_5$ diene. Of specific interest are those disclosed in:

1. U.S. Pat. No. 3,968,185
2. U.S. Pat. No. 3,816,371
3. U.S. Pat. No. 3,775,387
4. Baldwin et al. "Graft Curing With a Modified Butyl Rubber". *Chemistry and Properties of Crosslinked Polymers,* 1977 Academic Press, Inc., pg. 273-287.
5. "Conjugated Diene Butyl" *New Products Technical Information,* June 1976, Exxon Division, Linden, N.J.

The disclosures of these references are incorporated herein by reference.

Of specific interest in these references and particularly preferred for the purposes of this invention are those conjugated diene butyl polymers called "CDB" wherein the saturated hydrocarbon backbone is isobutylene and the conjugated diene structure is represented by:

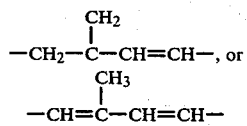

or mixtures thereof. Preferably the conjugated diene amounts to less than about 5 mole %, still more preferably, about 1-2 mole % of the structure and most preferably about 1.2-1.5 mole %. "CDB" is generally represented by the structures:

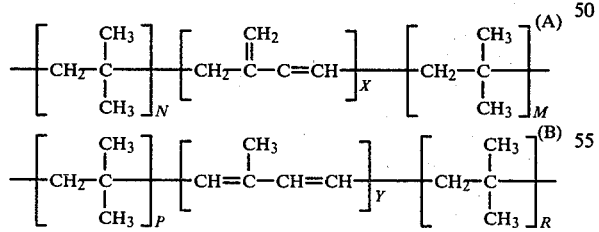

or mixtures of (A) and (B); wherein N, M, P and R are of a sufficient finite number and total so that the conjugated diene falls within the above ranges.

A particularly preferred CDB is one produced by Exxon Corporation. This CDB is the product of the synthesis of isobutylene and isoprene subsequently halogenated (e.g. Cl or Br) and then dehydrohalogenated. In short, it is the dehydrohalogenation product of chlorobutyl as reported in the above-identified literature reference incorporated herein by reference. This CDB is represented structurally by formulae (A) and (B) above and is usually a mixture thereof. In the most preferred polymers useful in the practice of this invention the structure of formula (A) is primary (i.e. predominates). In addition, N, X, M, P, Y and R have the same values as the halogenated butyl used in the process. A process for preparing these polymers is taught by U.S. Pat. No. 3,968,185 referenced above and incorporated herein by reference.

The percentage of polybutylene and conjugated diene butyl polymer employed may vary over a wide range depending upon the characteristics sought or needed in the final product. Generally speaking, the blends of this invention find advantageous use in forming products which, after curing particularly with ionizing radiation, require good resistance to set (less than about 80%), high strength characteristics as defined hereinabove and re-workability (as exhibited by a melt index of at least about 0.1). The amount of each constituent employed will be varied to achieve the desired end properties. For most compositions contemplated, the blend of polybutylene and conjugated diene butyl polymer will include 90-10% by weight polybutylene and 10-90% by weight conjugated diene butyl polymer. In certain preferred embodiments the blend consists essentially of 50-10% by weight polybutylene and 50-90% by weight conjugated diene butyl polymer.

Other ingredients are optional and may be added to the blend for their known purposes. Such ingredients include, for example, pigments, fillers, antioxidants, plasticizers, and the like, all of which are conventional and known for their intended purposes. Generally speaking, they are added in amounts conventionally recognized, but adjusted where necessary, so as not to degrade or defeat the intended purposes of this invention. Such amounts usually do not exceed 50% by weight of the total blend and usually less than 10% by weight. Carbon black is one specific example of a filler. Others include such compounds as titanium dioxide, other known inorganic opacifiers, organic pigments, and inorganic coloring agents. An example of a useful antioxidant is one manufactured by Ciba Geigy and trademarked IRGANOX 1010. This antioxidant is a hindered phenolic having a molecular weight of 1178. It is, by chemical nomenclature, tetrakis [methylene 3-(3',5',-ditert-butyl-4'-hydroxyphenyl)propionate]methane whose structure is generally recognized as:

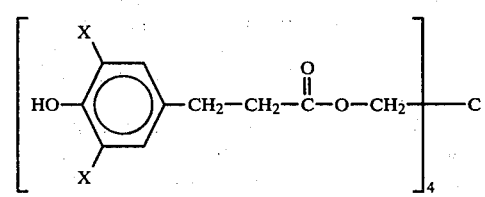

wherein X is:

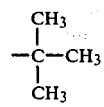

The amount of this antioxidant use, usually does not exceed about 1%. Other antioxidants, stabilizers, or agents used to impart specific end use properties such as flame retardants or blowing agents to produce foam may also be used. These are employed in amounts well known to those skilled in the art.

The blends of this invention are made by mixing polybutylene and one or more types of conjugated diene butyl polymer with an antioxidant and/or processing stabilizer (e.g. IRGANOX 1010) in a conventional rubber mill, Banbury mixer, extruder, kneader or other known type of blending equipment, and blended at elevated temperatures to insure homogeneous mixing, e.g. at about 275°–390° F., preferably 300°–335° F.

The blend may then be cured either before or after forming it into the desired product or ultimate shape. Since the preferred blends contemplated by this invention are curable by ionizing radiation, they may be so cured. In the less preferred blends, curing may be accomplished by the addition of a known and conventional curing agent using recognized curing techniques associated with the agent so used. When ionizing radiation is used, it may be delivered by any conventional equipment such as an electron accelerator. Dosages will be chosen to suit the individual blend, but generally speaking, dosages in the range of about 1–20 Mrads and preferably 2–4 Mrads are used, and have been found adequate to achieve the desired degree of curing without any significant amount of scissioning occurring during the process.

Some typical examples of products formed from the blends of this invention include: athletic shoe soles, electrical connectors, sealing tapes and molded automotive bumper components. These products may be formed using conventional techniques. Where advantageous, curing may be accomplished after the product (article) is formed, rather than curing the blend. However, and as pointed out above, one of the features of this invention is that in many instances working may be done after curing, and without additional curing. Thus, in certain instances, the blend will be cured followed by article formation.

Re-working of the products formed by this invention is possible because of the melt flow properties of the blend. A typical and general procedure for re-working a cured product previously formed is:

1. grinding the molded part in a suitable commercial grinder (e.g. Cumberland) to small chips or particles suitable for easy handling during subsequent steps;
2. re-extruding: re-molding, etc., by conventional techniques; and
3. re-curing if necessary.

The following examples are presented for illustrative purposes:

EXAMPLE I

Mixtures were prepared from 20 wt% polybutylene to 70 wt% polybutylene having a density of 0.910 and a melt index of 1.0 gm/10 min. This is a commercial material sold by Shell Chemical Co., as grade 1600A and 30 wt% conjugated diene butyl rubber to 80 wt% conjugated diene butyl having a diene content of 1.3 mole%, a chlorine content of 0.06 wt% and a molecular weight of 350,000–400,000 $\overline{MV}$ available commercially from Exxon Chemical Co.

Each of these blends was prepared in a rubber mill at a temperature of 325° F. and pressed by compression mold at 350° F. at 20,000 psi pressure into 6"×6"×0.060" pads. These pads were then irradiated using a 3 MeV Dynamitron ® to a dose of 1, 2, 3 and 4 Mrads, an unirradiated pad was also evaluated. The modulus at 100% elongation ($T_{100}$); ultimate tensile strength (U.T.S.); elongation, melt index and set are given in Table I.

As can be seen the strength at low elongation as given by $T_{100}$ for the blends are unexpectedly higher than either of the components of the blend subjected to the same treatment.

In addition, the data in Table I show that these blends retain some of the beneficial characteristics of both the plastic and the rubber used to make the blend. It is seen from the melt index values that the blends retain plastic flow as the polybutylene phase, while the % set data indicate that the blends do not take a permanent set on stretching as the plastic (H). Hence, one obtains the high strength of the blends along with unique elastoplastic properties not associated with either component.

TABLE I

| Material | A | B | C | D | E | F | G | H |
|---|---|---|---|---|---|---|---|---|
| Shell Polybutylene 1600 | 20 | 30 | 40 | 50 | 60 | 70 | — | 100 |
| CD-66 (Exxon, CDB) | 80 | 70 | 60 | 50 | 40 | 30 | 100 | — |
| 100% Modulus psi at 72° F. | | | | | | | | |
| No dose | 100 | 261 | 368 | 642 | 406 | 1060 | 260 | 325 |
| 1 Mr | 157 | 294 | 478 | 722 | 846 | 894 | 265 | 300 |
| 2 Mr | 168 | 287 | 465 | 700 | 835 | 1069 | 280 | 250 |
| 3 Mr | 160 | 306 | 485 | 780 | 845 | 1065 | 315 | 275 |
| 4 Mr | 160 | 260 | 540 | 780 | 850 | 1060 | 400 | 200 |
| U.T.S. psi at 72° F. | | | | | | | | |
| No dose | 164 | 419 | 1063 | 1237 | 1854 | 2742 | 600 | 3600 |
| 1 Mr | 450 | 600 | 1132 | 1462 | 1923 | 2900 | — | — |
| 2 Mr | 650 | 709 | 1158 | 1487 | 1897 | 2691 | — | — |
| 3 Mr | 690 | 809 | 1196 | 1808 | 2146 | 2518 | 650 | 3300 |
| 4 Mr | 605 | 685 | 1496 | 1816 | 1900 | 2685 | 750 | 3600 |
| UE % at 72° F. | | | | | | | | |
| 0 Mr | 770 | 770 | 770 | 770 | 770 | 770 | 600 | 330 |
| 1 Mr | 735 | 770 | 770 | 600 | 770 | 770 | — | — |
| 2 Mr | 565 | 770 | 770 | 770 | 770 | 770 | — | — |
| 3 Mr | 600 | 745 | 770 | 705 | 760 | 770 | 650 | 420 |
| 4 Mr | 600 | 700 | 680 | 640 | 720 | 750 | 450 | 430 |
| Melt Index gm/10min 230° C., 5kg | | | | | | | | |
| 0 Mr | $5 \times 10^{-1}$ | $5.8 \times 10^{-1}$ | $6 \times 10^{-1}$ | $5 \times 10^{-1}$ | 2.8 | 4.5 | 0 | 40.0 |

TABLE I-continued

| Material | A | B | C | D | E | F | G | H |
|---|---|---|---|---|---|---|---|---|
| 1 Mr | $1.3 \times 10^{-2}$ | $2 \times 10^{-2}$ | $3 \times 10^{-1}$ | $3 \times 10^{-1}$ | 1.0 | 3.6 | 0 | — |
| 2 Mr | $4.6 \times 10^{-3}$ | 0 | $4 \times 10^{-1}$ | $4 \times 10^{-1}$ | 1.36 | 4.9 | 0 | — |
| 3 Mr | 0 | 0 | $5 \times 10^{-1}$ | 1.28 | 2.0 | 10.2 | 0 | 49.0 |
| 4 Mr | 0 | 0 | 3.13 | 1.20 | 3.6 | 13.0 | 0 | 100.0 |
| % set | | | | | | | | |
| 0 Mr | 45 | 35 | 52 | 58 | 60 | 60 | 0-3 | 99-100 |
| 1 Mr | 34 | 40 | 48 | 54 | 60 | 62 | 0-3 | 99-100 |
| 2 Mr | 28 | 40 | 45 | 50 | 60 | 68 | 0-3 | 99-100 |
| 3 Mr | 25 | 40 | 45 | 50 | 60 | 70 | 0-3 | 99-100 |
| 4 Mr | 25 | 35 | 42 | 50 | 60 | 75 | 0-3 | 99-100 |

N.B. 770 represents the maximum travel of the tensile tester used.

EXAMPLE II

Mixtures I-L were formulated and tested in the same manner as mixtures A-H of Example I, except polypropylene was used in place of polybutylene.

| Material | | I | J | K | L |
|---|---|---|---|---|---|
| Exxon CD 66 | | 80 | 50 | 20 | — |
| NorchemIsotactic Polypropylene (high MW.) | | 20 | 50 | 80 | 100 |
| 100% Modulus psi | | | | | |
| at 72° F. | No Dose | 292.6 | 1259.0 | 0 | 0 |
| | 1 Mr | 321.0 | 1188.0 | 0 | 0 |
| | 2 Mr | 387.0 | 1480.0 | 0 | 0 |
| | 3 Mr | 334.0 | 1416.0 | 0 | 0 |
| | 4 Mr | 318.0 | 1280.0 | 0 | 0 |
| UTS psi | | | | | |
| at 72° F. | No Dose | 301.1 | 1259.0 | 3046.0 | 4947.0 |
| | 1 Mr | 520.0 | 1223.5 | 3129.0 | 4774.8 |
| | 2 Mr | 761.0 | 1280.0 | 3379.0 | 4882.5 |
| | 3 Mr | 679.3 | 1474.9 | 3047.7 | 5093.0 |
| | 4 Mr | 798.8 | 1443.0 | 3134.1 | 4937.0 |
| UE % | | | | | |
| at 72° F. | No dose | 300 | 115 | 70 | 42 |
| | 1 Mr | 500 | 230 | 70 | 25 |
| | 2 Mr | 725 | 130 | 60 | 35 |
| | 3 Mr | 600 | 300 | 30 | 28 |
| | 4 Mr | 620 | 175 | 55 | 20 |
| Melt Index gm/10min | | | | | |
| 230° C.; 5 kg | No dose | 12.0 | 5.2 | 32.0 | 58.0 |
| | 1 Mr | 11.6 | 3.0 | 54.0 | 100.0 |
| | 2 Mr | 10.8 | 12.0 | 72.0 | 124.0 |
| | 3 Mr | 13.0 | 12.5 | 96.0 | 208.0 |
| | 4 Mr | 18.4 | 15.4 | 92.0 | 232.0 |
| % set | 0 Mr | 42 | 100 | 100 | 100 |
| | 1 Mr | 35 | 100 | 100 | 100 |
| | 2 Mr | 30 | 100 | 100 | 100 |
| | 3 Mr | 20 | 100 | 100 | 100 |
| | 4 Mr | 10 | 100 | 100 | 100 |

EXAMPLE III

The following mixture was formulated in the same manner as mixtures A-L in Examples I-II, except that high density polyethylene was employed instead of polybutylene or polypropylene.

| Material | M |
|---|---|
| CD 66 | 50 |
| Citco CS 315 HDPE (polyethylene) | 50 |

The above material has a melt index of 0.1 gm/10 min. (at 230° C.; 5 kg) initially at a dose of 3.0 Mr. Reworking this material by grinding and a subsequent milling for 4 minutes at 320° F. shows that the melt index drops to zero for all practical purposes. An attempt was also made to remold this material by compression molding at 350° F. and 20,000 psi pressure. The particles would not flow to fill the mold and form a 6"×6"×0.060" pad.

Once given the above disclosure, many other features, modifications and improvements will become apparent to the skilled artisan. Such other features, modifications, and improvements are, therefore, considered to be a part of this invention, the scope of which is to be determined by the following claims:

We claim:

1. A composition comprising polybutylene and a conjugated diene butyl polymer.

2. A composition according to claim 1 wherein said butyl polymer comprises a copolymer of isobutylene and a conjugated $C_5$ diene.

3. A composition according to claim 2 wherein said copolymer is represented by the structures:

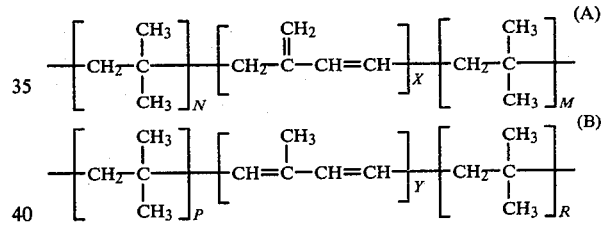

or mixtures of (A) and (B); wherein N, M, P and R are of a sufficient finite number and total so that the conjugated diene amounts to less than about 5 mole % of the structure.

4. A composition according to claim 3 wherein the conjugated diene amounts to about 1-2 mole % of the structure.

5. A composition according to claims 1, 2, 3 or 4 wherein said butyl polymer is cross-linkable.

6. A composition according to claim 5 wherein said butyl polymer consists essentially of said copolymer.

7. A composition according to claim 6 wherein said composition comprises about 90-10 percent by weight polybutylene and about 10-90 percent by weight conjugated diene butyl polymer.

8. A composition according to claim 7 wherein said composition comprises about 50-10 percent by weight polybutylene and about 50-90 percent by weight conjugated diene butyl polymer.

9. A composition according to claim 8 wherein said polybutylene is a flexible, crystalline, isotactic polyolefin having a density of about 0.91 or greater.

10. A composition according to claim 9 wherein said polybutylene has a melt index of from about 0.4-20.0.

11. A composition according to claim 5 wherein said composition is curable by subjecting it to ionizing radiation.

12. A composition according to claim 11 wherein said ionizing radiation is in a dose amount of about 1-20 Mrads.

13. A composition according to claim 12 wherein said dose amount is about 2-4 Mrads.

14. An article comprised of a blend which includes polybutylene and a conjugated diene butyl polymer, said article being capable of curing when subjected to ionizing radiation to a product which exhibits resistance to set and which can be heated after it is cured to a re-workable plastic consistency with significant melt flow properties.

15. An article according to claim 14 consisting essentially of said blend, and wherein said conjugated butyl diene polymer comprises a copolymer of isobutylene and a conjugated $C_5$ diene.

16. An article according to claim 15 wherein said copolymer is represented by the structure:

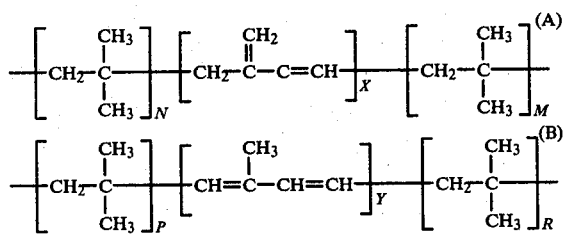

or mixtures of (A) and (B); wherein N, M, P and R are of a sufficient finite number and total so that the conjugated diene amounts to less than about 5 mole % of the structure.

17. An article according to claim 16 wherein said butyl diene polymer consists essentially of said copolymer and is a dehydrohalogenation product of halogenated butyl polymer which possesses a conjugated unsaturation in the linear backbone and wherein N, M, X, P, Y and R have the same values as the halogenated butyl polymer used in the process.

18. An article according to claim 17 wherein said copolymer is primarily that represented by (A).

19. An article according to claims 14, 15 or 16 wherein said blend consists essentially of about 90-10 percent by weight polybutylene and 10-90 percent by weight butyl polymer.

20. An article according to claim 19 wherein said blend consists essentially of about 50-10 percent by weight polybutylene and about 50-90 percent by weight conjugated diene butyl polymer.

21. An article according to claim 19 which after curing by ionizing radiation exhibits a % set of less than about 80%.

22. An article according to claim 21 which after curing by ionizing radiation in an amount of about 1-4 Mrads exhibits a % set of about 25-75%.

23. An article according to claim 21 wherein said article after said curing exhibits:
 a 100% modulus (psi) of elongation ($T_{100}$) at 72° F. of about 150-1100;
 an ultimate strength (U.T.S. psi) at 72° F. of about 450-3000;
 an ultimate elongation (UE%) at 72° F. of at least about 560; and
 a melt index (gm/10 min at 230° C., 5 Kg) of about $1 \times 10^{-2}$ to 13.

24. An article consisting essentially of a blend of polybutylene and a conjugated diene butyl polymer which after curing by ionizing radiation will exhibit a modulus strength ($T_{100}$) greater than either the said polybutylene or conjugated diene butyl polymer used in the blend.

25. An article according to claim 23 wherein said article is so cured.

26. An article according to claim 24 wherein said butyl polymer consists essentially of a copolymer of isobutylene and a conjugated $C_5$ diene.

* * * * *

UNITED STATES PATENT AND TRADEMARK OFFICE
CERTIFICATE OF CORRECTION

PATENT NO. : 4,300,988
DATED : November 17, 1981
INVENTOR(S) : Berejka/Bradley

It is certified that error appears in the above–identified patent and that said Letters Patent are hereby corrected as shown below:

Col. 3, line 39.

Formula for Conjugated Diene Butyl Polymers that portion of the formula reading:

$$-CH_2-\underset{|}{\overset{CH_2}{C}}\ -CH=CH-, \text{ should read } -CH_2-\underset{\|}{\overset{CH_2}{C}}\ -CH=CH-$$

Signed and Sealed this

Fourteenth Day of June 1983

[SEAL]

Attest:

DONALD J. QUIGG

Attesting Officer    Acting Commissioner of Patents and Trademarks